United States Patent

[11] 3,577,015

[72] Inventors George W. Niemann
Dallas;
Robert A. Stehlin, Richardson, Tex.

[21] Appl. No. 787,794
[22] Filed Dec. 30, 1968
[45] Patented May 4, 1971
[73] Assignee Texas Instruments, Incorporated
Dallas, Tex.

[54] MONOSTABLE MULTIVIBRATOR WITH LOW POWER REQUIREMENTS
7 Claims, 3 Drawing Figs.

[52] U.S. Cl. ........ 307/273, 307/247, 307/288, 328/207
[51] Int. Cl. ........ H03k 3/26
[50] Field of Search ........ 307/273, 247, 288; 328/195, 196, 207

[56] References Cited

UNITED STATES PATENTS

| | | | |
|---|---|---|---|
| 2,948,820 | 8/1960 | Bothwell | 307/288X |
| 3,042,810 | 7/1962 | Rochelle | 307/288X |
| 3,488,513 | 1/1970 | Ryerson | 307/247X |
| 3,473,045 | 10/1969 | Niemann | 307/291X |

*Primary Examiner*—Stanley D. Miller, Jr.
*Attorneys*—James O. Dixon, Andrew M. Hassell, Harold Levine, Melvin Sharp, John Vandigriff, Henry T. Olsen, Michael A. Sileo, Jr. and Richards, Harris and Hubbard

ABSTRACT: The invention disclosed is a monostable multivibrator circuit having first and second pairs of complementary transistors, with each pair connected collector-to-collector in series. The bases of the first pair of transistors are coupled to a first output terminal at the juncture between collectors of the second pair of transistors. The bases of the second pair of transistors are coupled to a second output terminal at the juncture between the collectors of the first pair of transistors. Terminals are provided for applying electrical power across the first and second pairs of transistors in order to maintain one transistor in each of the transistor pairs in a conductive state. A normally nonconductive trigger transistor is connected to the circuit for receiving a trigger signal in order to vary the state of each of the transistors for a preselected monostable timing period.

INVENTORS:
GEORGE W. NIEMANN
ROBERT A. STEHLIN

ATTORNEY

INVENTORS:
GEORGE W. NIEMANN
ROBERT A. STEHLIN

ATTORNEY

MONOSTABLE MULTIVIBRATOR WITH LOW POWER REQIREMENTS

The invention herein described was made in the course of or under a contract or subcontract thereunder with the Department of the Army.

This invention relates to multivibrator circuits, and more particularly to monostable multivibrator circuits including cross coupled pairs of complementary transistors.

Multivibrators have long found a variety of uses as timing devices and the like in electronic systems. However, previously developed transistor multivibrators have required power supplies of several volts or more, and further have not been operable over a wide range of power supply voltage magnitudes. Moreover, many previously developed multivibrator circuits have not had adequate speed-power products, and have not provided sufficiently low impedances for loads driven in both positive and negative directions. Problems in noise immunity have also often arisen with prior multivibrators, due to the fact that their output logic high and low voltages have not been properly clamped.

In accordance with the present invention, first and second pairs of series connected complementary electronic switching devices have control electrodes which are cross coupled to a juncture point of the opposite pair of switching devices. The control electrode of one of the switching devices is coupled to ground potential through a resistance. When the states of conduction of the switching devices are varied by a trigger signal, the circuit initiates a one-shot timing interval.

In a more specific aspect of the invention, first and second pairs of complementary transistors are each connected in series. The bases of each pair of transistors are cross coupled to output terminals at the juncture between the opposite pair of transistors. Electrical power is applied across the first and second pairs of transistors in order to maintain one transistor in each of the pairs in a conductive state. A trigger circuit is coupled to the base of one of the transistors for receiving a trigger signal to vary the state of each of the transistors for a predetermined timing interval.

Figure 1:
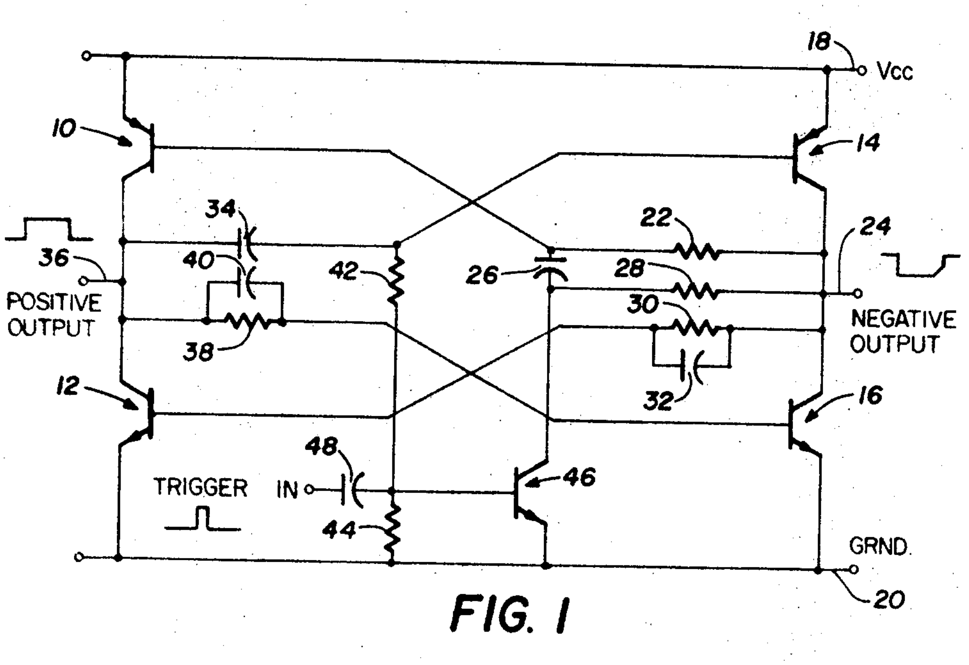
Figure 3:
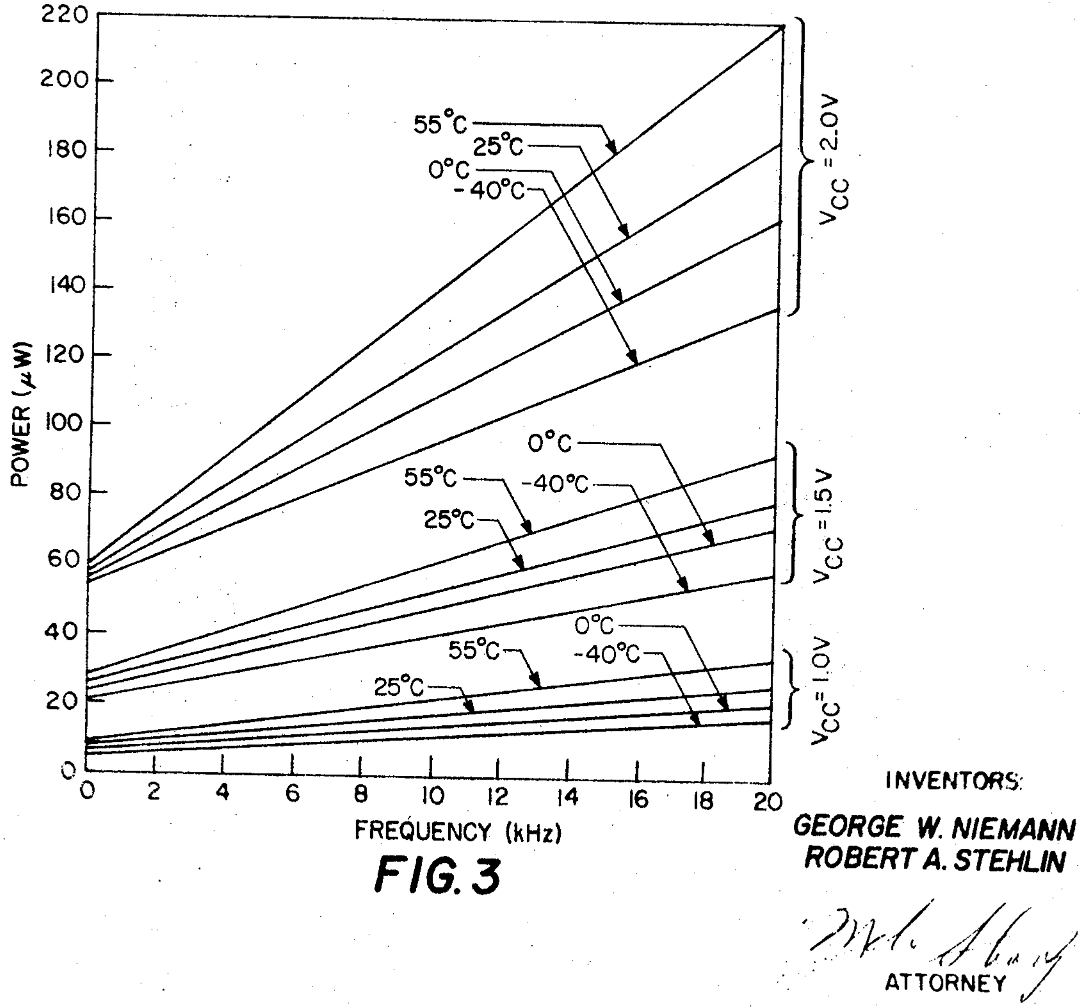

For a more complete understanding of the present invention and for further objects and advantages thereof, reference is now made to the following description taken in conjunction with the accompanying drawings, in which:

FIG. 1 is a schematic diagram of the present multivibrator circuit;

FIGS. 2*a—f* are waveforms illustrating the operation of various portions of the circuit shown in FIG. 1 and FIG. 3 is a graph illustrating the variance in power requirements of the present multivibrator circuit with changes in operating frequency and temperature.

Referring to FIG. 1, the present monostable multivibrator circuit comprises a first pair of complementary transistors 10 and 12 connected in a series collector-to-collector configuration. The term complementary will be used hereafter to refer to transistors, or other electronic switching devices, which are of opposite conductivity types but which have matched parameters such as $V_{BE}$, $V_{CE(SAT)}$, $f_T$ and $h_{FE}$. Transistor 10 is thus a PNP-type transistor, while transistor 12 is an NPN-type transistor. Similarly, a second pair of complementary transistors 14 and 16 are also connected in a collector-to-collector series configuration. Transistor 14 is a PNP-type transistor, and transistor 16 is an NPN-type transistor. A positive supply of bias voltage $V_{CC}$ is applied across the pairs of series connected transistors at terminals 18 and 20. It will of course be understood that the transistor types utilized in the present circuit may be reversed upon the reversal of polarity of the biasing voltage.

The base of transistor 10 is connected through a resistor 22 to an output terminal 24 located at the juncture of the collectors of transistors 14 and 16. A capacitor 26 and a resistor 28 are connected across the resistance 22. The base of the transistor 12 is coupled through a parallel resistor 30 and capacitor 32 to output terminal 24. The base of transistor 14 is cross coupled via a capacitor 34 to a second output terminal 36 which is located at the juncture of the collectors of transistors 10 and 12. The base of transistor 16 is cross coupled via a parallel resistance 38 and capacitor 40 configuration to the output terminal 36.

The base of transistor 14 is coupled through a resistance 42 and resistance 44 to circuit ground. A trigger transistor 46 is connected at its collector to the juncture between capacitor 26 and resistor 28 and at its emitter to circuit ground. The base of the transistor 46 is connected to the juncture between resistors 42 and 44, and through a capacitor 48 to a supply of input trigger impulses. Transistor 46 is biased by resistors 42 and 44 just below cutoff.

Figure 2:
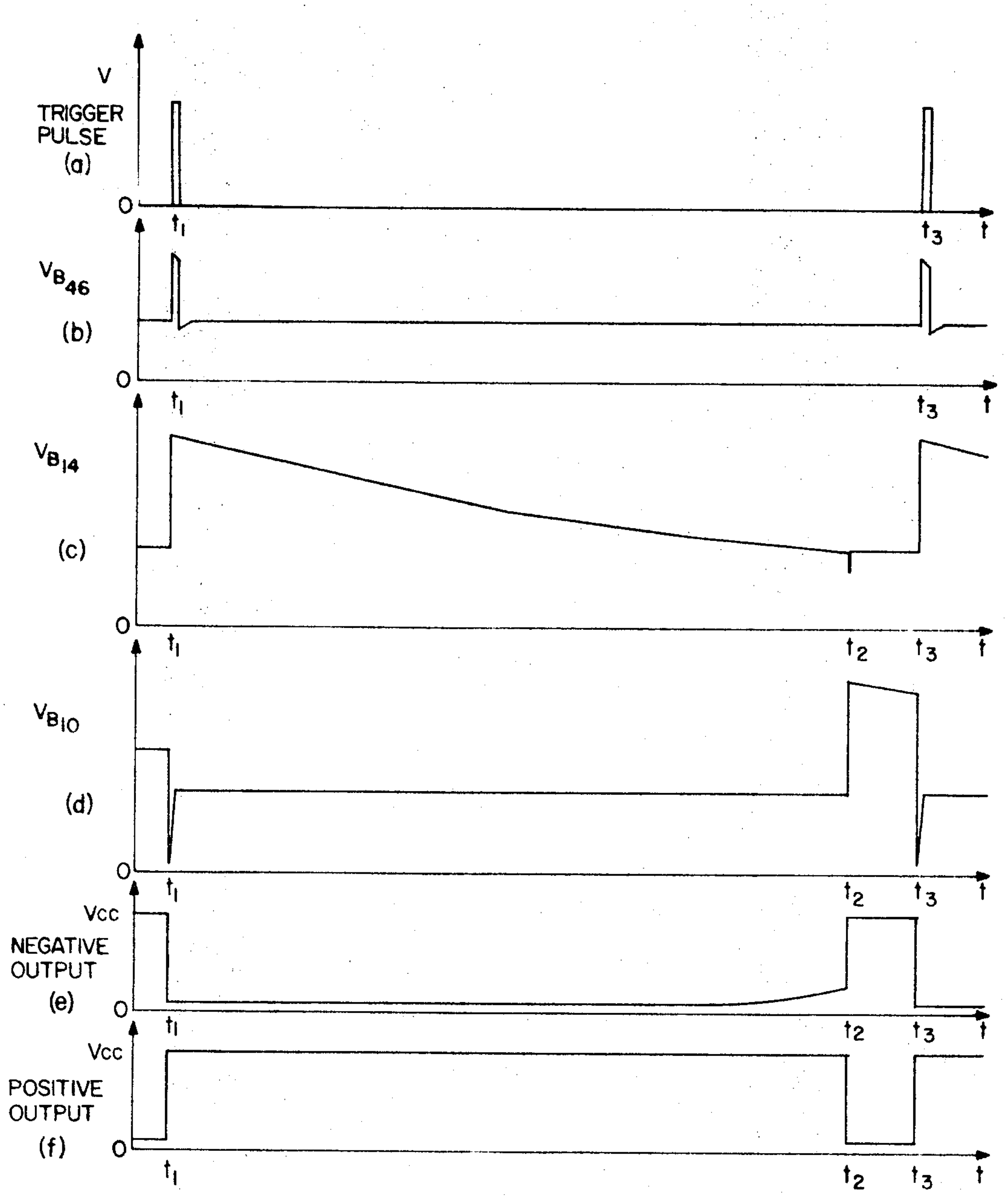

The operation of the monostable circuit shown in FIG. 1 will become apparent from the waveforms shown in FIG. 2 and from the following description. In the steady of quiescent state of the circuit, transistors 12 and 14 are held in conductive states, while transistors 10 and 16 are in nonconductive states. Transistor 14 is held in a conductive state by base current flowing through resistor 42 and 44 to circuit ground. Transistor 12 is held in a conductive state by base current drive through transistor 14 and resistor 30. Transistor 10 is held in a nonconductive state by the negative output being high. Transistor 16 is held in a nonconductive state by the positive output being low.

In the steady or quiescent state, a substantially zero output voltage appears at the output terminal 36, while a relatively high voltage approximating $V_{CC}$ appears at the output terminal 24. The steady state outputs are illustrated by curves **2*e* and 2*f* in the time interval $0—t_1$. Transistor 46 is normally maintained just below its conduction threshold by the biasing effect applied through resistors 42 and 44. Thus, upon the application of a relatively low amplitude trigger pulse to the base of transistor 46**, shown in FIG. 2*a* at $t_1$, the transistor 46 becomes momentarily conductive as shown in FIG. 2*b* at $t_1$. Conduction of transistor 46 causes the base of transistor 10 to go negative, as illustrated in FIG. 2*d* at $t_1$.

Transistor 10 then becomes conductive and the positive output shown in FIG. 2*f* becomes positive at a voltage approaching $V_{CC}$. Base drive is provided for transistor 16 through transistor 10 and resistor 38 to turn transistor 16 on. The conduction of transistor 16 causes transistor 12 to be held in a nonconductive state because of the low voltage applied across resistor 30. A high voltage appears on the base of transistor 14, FIG. 2*c*, because of $C_{34}$, thereby turning transistor 14 off.

The voltage applied to the base of the transistor 14 decays at an exponential rate as illustrated by the waveform in FIG. 2*c* between the time interval $t_1—t_2$. The voltage thus decays to a point wherein transistor 14 again becomes conductive at time $t_2$. The timing interval $t_1—t_2$ of the circuit depends upon the values of capacitor 34 and resistors 42 and 44. Upon the conduction of transistor 14, transistors 10 and 16 are turned off, while transistor 12 is turned on.

The conduction of transistor 14 at $t_2$ brings the negative output shown in FIG. 2*e* back up to a relatively high voltage approximating $V_{CC}$. Simultaneously, the positive output voltage falls to approximately zero, as illustrated in FIG. 2*f*. The circuit then remains in the quiescent state until again triggered by another trigger pulse at $t_3$, wherein the monostable timing cycle again occurs.

Using a conventional equivalent circuit mathematical approach with the multivibrator circuit of FIG. 1, it may be shown that the pulse width of the circuit is represented as follows:

$$t_{ON}-(R_{42}+R_{44})C_{34}\ 1n\frac{[2V_{CC}-V_{BE}-2V_{CE(SAT)}]}{V_{CC}-V_{BE}}$$

wherein:

$t_{ON}$ = time interval of output pulse in seconds, $R_{42}$ = the resistance in ohms of resistor 42, $R_{44}$ = the resistance in ohms of resistor 44, $C_{34}$ = the capacitance in farads of capacitors 34, $V_{CC}$ = magnitude in volts of the biasing voltage, $V_{BE}$ = the voltage across the base and emitter of transistor 14, $V_{CE(SAT)}$ = the voltage across the collector and emitter of transistor 14 during saturation.

From the equation, it will be seen that the timing period for the monostable multivibrator of the present invention is dependent upon the values of resistors 42 and 44, the magnitude of the capacitor 34, and the magnitude of the bias voltage $V_{CC}$. Thus, by varying the magnitude of resistors 42 and 44, or capacitor 34, the frequency of operation of the circuit may be selectively varied. Moreover, by varying the magnitude of $V_{CC}$ applied to the circuit, the length of the timing interval of the circuit may be changed.

The present circuit has been found to provide excellent operating characteristics with a supply voltage as low as 1 volt, due to the utilization of the complementary transistor configurations. These complementary configurations do not require collector current when the PNP transistors are in the nonconductive state, and the primary power dissipated by the circuit is the required base current for the transistors. The present circuit is operable with extremely low bias voltages, as the circuit does not require two conducting transistors in series. The present circuit will operate over a large range of bias voltages, with both the high and low output voltages clamped by the saturation of at least one transistor.

FIG. 3 illustrates the power requirements for varied frequencies of operation of the circuit of FIG. 1. The standby power for the circuit can be made extremely low, being limited only by the ability of the transistors to maintain sufficient current gain at very low collector current. The slope of the curves shown in FIG. 3 is determined by the total circuit capacitance, of which the speedup capacitors of the circuit comprise a major portion thereof. The slope of the curves is thus a measure of the AC parameters, and the starting point of the curves is a measure of the DC parameters. For higher values of $V_{CC}$ than 1 volt, smaller capacitance could be utilized in the circuit, and thus the slope of the curves may be substantially reduced.

Although it will be understood that various values or components of the circuit shown in FIG. 1 may be used for various applications, the following is a tabulation of component values which have been found to work well in practice for one application:

$V_{CC}$=volts
$R_{22}$=k ohms
$R_{28}$=k ohms
$R_{30}$=k ohms
$R_{38}$=k ohms
$R_{42}$=k ohms
$R_{44}$=k ohms
$C_{26}$=pf.
$C_{32}$=pf.
$C_{34}$=pf.
$C_{40}$=pf.
$C_{48}$=pf.

The present circuit is particularly adapted for fabrication as a miniaturized integrated circuit. For example, both pairs of the complementary transistors may be formed according to the disclosure of patent application, Ser. No. 650,303, entitled "Process for Fabricating Monolithic Circuits Having Matched Complementary Transistors and Products," filed June 30, 1967, now U.S. Pat. No. 3,465,219, issued Sept. 2, 1969, assigned to the assignee hereof. However, the present circuit may also be advantageously utilized with conventional transistor circuit applications.

Whereas the present invention has been described with respect to a specific embodiment thereof, it will be understood that various changes and modifications will be suggested to one skilled in the art, and it is desired to encompass such changes and modifications which fall within the scope of the appended claims.

We claim:

1. A triggered monostable multivibrator having a preselected timing period, comprising in combination:

a. a first normally conducting transistor of one conductivity type having collector, emitter and base electrodes and a second normally nonconducting transistor of opposite conductivity type having collector, emitter and base electrodes, said first and second transistors being connected in series in a common collector configuration with their emitters being respectively connected to first and second voltage sources;

b. a third normally conducting transistor of said one conductivity type having collector, emitter and base electrodes and a fourth normally nonconducting transistor of said opposite conductivity type having collector, emitter and base electrodes, said third and fourth transistors being connected in series in a common collector configuration with their emitters being respectively connected to said first and second voltage sources;

c. an input transistor of said opposite conductivity type having collector, emitter and base electrodes with the emitter electrode thereof being connected to said second voltage source and with the base electrode thereof being coupled to a source of input signals; and d. first and second output means respectively connected to the common collectors of said first and second transistors and said third and fourth transistors; wherein e. the base electrode of said first transistor is AC coupled to said second output means and DC connected to said second voltage source; and wherein f. the base electrodes of said second and fourth transistors are respectively AC and DC coupled to said second and first output means; and wherein g. the base of said third transistor is AC and DC coupled to said first output means and AC coupled to the collector electrode of said input transistor; whereby h. when a trigger signal is coupled to said input transistor, said first, second, third and fourth transistors change their conductive states and remain therein for said preselected timing period, whereupon said transistors return to their original conductive state to produce triggered monostable multivibrator operation.

2. The triggered monostable multivibrator of claim 1 wherein said base electrode of said first transistor is AC coupled to said second output means through a capacitor, and DC connected to said second voltage source through a resistor.

3. The triggered monostable multivibrator of claim 1 wherein said base electrodes of said second and fourth transistors are respectively AC and DC coupled to said second and first output means through respective parallel RC circuits.

4. The triggered monostable multivibrator of claim 1 wherein said third transistor is AC and DC coupled to said first output means through a series-parallel RC circuit, and AC coupled to the collector electrode of said input transistor through the capacitor of said series-parallel RC circuit.

5. The triggered monostable multivibrator of claim 1 wherein said one conductivity type is PNP and said opposite conductivity type is NPN.

6. The triggered monostable multivibrator of claim 1 wherein said first and second transistors are matched complementary transistors and said third and fourth transistors are matched complementary transistors.

7. The triggered monostable multivibrator of claim 1 wherein said first voltage source is one volt and said second voltage source is ground.